United States Patent
Steely, Jr. et al.

(10) Patent No.: US 7,360,069 B2
(45) Date of Patent: Apr. 15, 2008

(54) SYSTEMS AND METHODS FOR EXECUTING ACROSS AT LEAST ONE MEMORY BARRIER EMPLOYING SPECULATIVE FILLS

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 10/756,639

(22) Filed: Jan. 13, 2004

(65) Prior Publication Data

US 2005/0154866 A1 Jul. 14, 2005

(51) Int. Cl.
*G06F 9/00* (2006.01)
(52) U.S. Cl. .................. 712/228; 712/228; 711/130
(58) Field of Classification Search ............. 712/228, 712/235; 711/130, 142, 146
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,491,811 A * | 2/1996 | Arimilli et al. | 711/144 |
| 5,519,841 A | 5/1996 | Sager et al. | |
| 5,615,350 A * | 3/1997 | Hesson et al. | 712/218 |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,958,019 A | 9/1999 | Hagersten et al. | |
| 6,032,231 A | 2/2000 | Gujral | |
| 6,038,646 A * | 3/2000 | Sproull | 711/158 |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,134,646 A | 10/2000 | Feiste et al. | |
| 6,151,671 A | 11/2000 | D'Sa et al. | |
| 6,209,065 B1 | 3/2001 | Van Doren et al. | |

(Continued)

OTHER PUBLICATIONS

Gharachorloo, et al., "Memory Consistency and Event Ordering in Scalable Shared-Memory Multiprocessors", Computer Systems Laboratory, Stanford University, CA 94305, pp. 1-14.

(Continued)

*Primary Examiner*—Alford Kindred
*Assistant Examiner*—Ernest Unelus

(57) ABSTRACT

Multi-processor systems and methods are provided. One embodiment relates to a multi-processor system that may comprise a processor having a processor pipeline that executes program instructions across at least one memory barrier with data from speculative data fills that are provided in response to source requests, and a log that retains executed load instruction entries associated with executed program instruction. The executed load instruction entries may be retired if a cache line associated with data of the speculative data fill has not been invalidated in an epoch that is different from the epoch in which the executed load instruction is executed.

33 Claims, 8 Drawing Sheets

U.S. PATENT DOCUMENTS

| | | | |
|---|---|---|---|
| 6,275,905 B1 * | 8/2001 | Keller et al. | ............... 711/141 |
| 6,286,090 B1 | 9/2001 | Steely, Jr. et al. | |
| 6,301,654 B1 | 10/2001 | Ronchetti et al. | |
| 6,317,811 B1 | 11/2001 | Deshpande et al. | |
| 6,345,342 B1 | 2/2002 | Arimilli et al. | |
| 6,349,382 B1 | 2/2002 | Feiste et al. | |
| 6,356,918 B1 | 3/2002 | Chuang et al. | |
| 6,408,363 B1 | 6/2002 | Lesartre et al. | |
| 6,412,067 B1 | 6/2002 | Ramirez et al. | |
| 6,457,101 B1 | 9/2002 | Bauman et al. | |
| 6,535,941 B1 | 3/2003 | Kruse | |
| 6,553,480 B1 | 4/2003 | Cheong et al. | |
| 6,574,712 B1 | 6/2003 | Kahle et al. | |
| 6,591,348 B1 | 7/2003 | Deshpande et al. | |
| 6,594,821 B1 | 7/2003 | Banning et al. | |
| 6,615,343 B1 | 9/2003 | Talcott et al. | |
| 6,633,960 B1 | 10/2003 | Kessler et al. | |
| 6,633,970 B1 * | 10/2003 | Clift et al. | ............... 712/217 |
| 6,651,143 B2 | 11/2003 | Mounes-Toussi | |
| 6,775,746 B2 * | 8/2004 | Quach et al. | ............... 711/135 |
| 6,775,749 B1 | 8/2004 | Mudgett et al. | |
| 2001/0055277 A1 | 12/2001 | Steely, Jr. et al. | |
| 2002/0009095 A1 | 1/2002 | Van Doren et al. | |
| 2002/0046334 A1 * | 4/2002 | Wah Chan et al. | ......... 712/223 |
| 2002/0099833 A1 | 7/2002 | Steely, Jr. et al. | |
| 2002/0099913 A1 | 7/2002 | Steely, Jr. | |
| 2002/0146022 A1 | 10/2002 | Van Doren et al. | |
| 2002/0194290 A1 | 12/2002 | Steely, Jr. et al. | |
| 2002/0194436 A1 | 12/2002 | McKenney | |
| 2002/0199067 A1 * | 12/2002 | Patel et al. | ............... 711/145 |
| 2003/0069902 A1 | 4/2003 | Narang et al. | |
| 2003/0145136 A1 | 7/2003 | Tierney et al. | |
| 2003/0195939 A1 | 10/2003 | Edirisooriya et al. | |

OTHER PUBLICATIONS

Gharachorloo, et al., "Architecture and Design of AlphaServer GS320", pp. 1-16.

Lipasti et al. *Value Locality and Load Value Prediction*, ASPLOS-VII, Oct. 1996.

* cited by examiner

SYSTEMS AND METHODS FOR EXECUTING ACROSS AT LEAST ONE MEMORY BARRIER EMPLOYING SPECULATIVE FILLS

CROSS REFERENCE TO RELATED APPLICATIONS

This application is related to the following commonly assigned co-pending patent applications entitled: "COHERENT SIGNAL IN A MULTI-PROCESSOR SYSTEM," Ser. No. 10/756,638; "MULTI-PROCESSOR SYSTEMS AND METHODS FOR BACKUP FOR NON-COHERENT SPECULATIVE FILLS," Ser. No. 10/756,637; "CACHE SYSTEMS AND METHODS FOR EMPLOYING SPECULATIVE FILLS," Ser. No. 10/756,638; "REGISTER FILE SYSTEMS AND METHODS FOR EMPLOYING SPECULATIVE FILLS," Ser. No. 10/756,644; "MULTI-PROCESSOR SYSTEM UTILIZING SPECULATIVE SOURCE REQUESTS," Ser. No. 10/756,640; "MULTI-PROCESSOR SYSTEM RECEIVING INPUT FROM A PRE-FETCH BUFFER," Ser. No. 10/756,537; "SOURCE REQUEST ARBITRATION," Ser. No. 10/755,914; "SYSTEMS AND METHODS FOR EMPLOYING SPECULATIVE FILLS," Ser. No. 10/755,938; "CONSISTENCY EVALUATION OF PROGRAM EXECUTION ACROSS AT LEAST ONE MEMORY BARRIER," Ser. No. 10/756,534, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

Multi-processor systems are also designed to assure memory consistency associated with memory reference operation ordering. Sequential memory consistency models require the memory reference operations of a process to appear to the rest of the system to execute in program order, even though much of the execution of the program can occur in parallel. The sequential consistency model imposes severe restrictions on the outstanding accesses that a process may have and effectively prohibits many hardware optimizations that could increase performance. A relaxed consistency model attempts to relax the constraints on the allowable event orderings, while still providing a reasonable programming model for the programmer. In a relaxed constancy model, an order is imposed between selected sets of memory reference operations, while other operations are considered unordered. One or more memory barrier or fences instructions are used to indicate the required order. However, no order is required between reference instructions that are not separated by a memory barrier or fence.

SUMMARY

One embodiment of the present invention may comprise a multi-processor system. The multi-processor system may comprise a processor having a processor pipeline that executes program instructions across at least one memory barrier with data from speculative data fills that are provided in response to source requests. The multi-processor system may comprise a log that retains executed load instruction entries associated with executed program instructions. The executed load instruction entries may be retired if a cache line associated with data of the speculative data fill has not been invalidated in an epoch that is different from the epoch in which the executed load instruction is executed.

Another embodiment of the present invention may comprise a processor in a multi-processor system. The processor may comprise a processor pipeline that executes program instructions across at least one memory barrier with a speculative data fill that is received in response to a source request. The processor may comprise a cache load backup system operative to set the processor pipeline to a previous processor pipeline execution state associated with an executed load instruction address if data from a speculative data fill associated with the executed load instruction is determined to be invalidated in an epoch prior to an epoch in which the executed load instruction is executed.

Yet another embodiment of the present invention may comprise a multi-processor system that employs a cache coherency protocol. The system may comprise means for executing program instructions associated with a source processor across at least one memory barrier employing speculative data fills received in response to a source requests, means for storing executed load entries associated with executed program load instructions executed by the means for executing, and means for retiring the executed load entries if a speculative data fill associated with the executed load entry is determined to be coherent and a cache line associated with the speculative data fill has been determined not to have been invalidated in an epoch prior to an epoch in which the executed load entry is executed.

Another embodiment may relate to a method of executing program instructions employing a speculative data fill in a multi-processor system. The method may comprise executing program instructions across at least one memory barrier with data from a speculative data fill that is provided in response to a source request. The method may further comprise storing executed load entries in a log, each of the executed load entries comprising a load address and a program instruction address associated with a respective executed load instruction, and retiring a respective executed load entry from the log if a cache line associated with the speculative data fill has not been invalidated in an epoch that is prior to an epoch in which the executed load instruction is executed.

DETAILED DESCRIPTION

Figure 1:
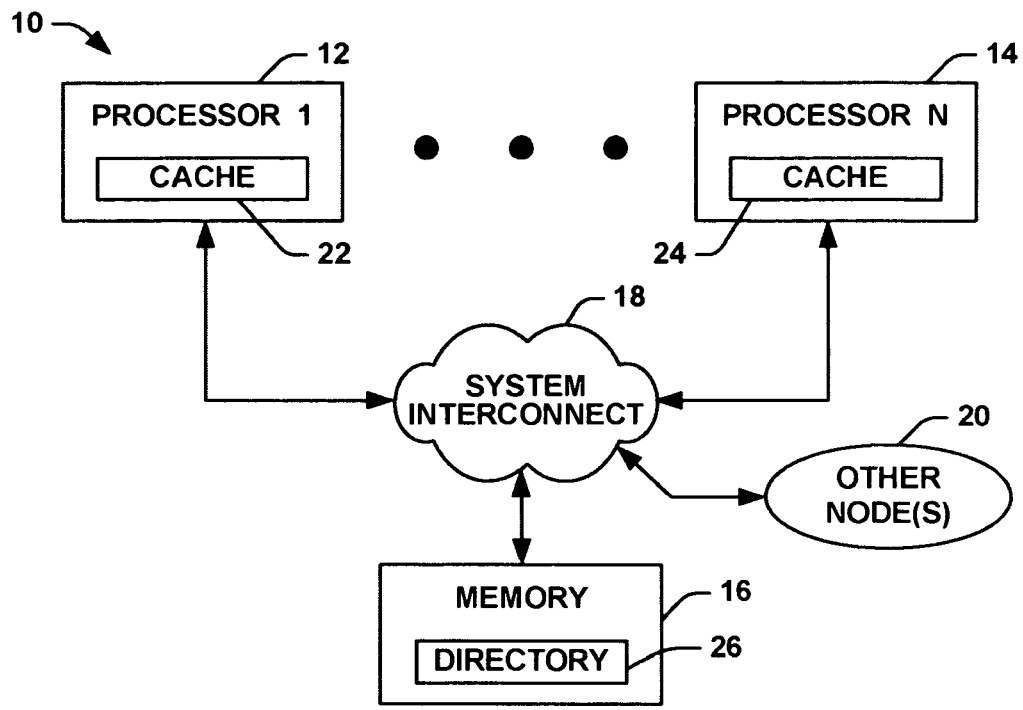
FIG. 1 depicts an example of a multiprocessor system.

This disclosure relates generally to systems and methods for processor speculation and backup in a multi-processor system. A source processor employs a speculative data fill in response to source request. A source request is a request for data associated with a cache line from the multi-processor system. The source request will be generated in response to a processor load or store instruction that experiences a cache miss, such that the requested memory block or data fill associated with a cache line does not reside in the processor's local cache. A data fill refers to a copy of a memory block associated with a given cache line. The source processor can employ one or more speculative data fills or copies of the requested data to continue execution of load instructions across at least one memory barrier, such that the execution of program instructions continues execution over at least one subsequent epoch. An epoch is defined as a portion of program instruction between two memory barriers.

Memory references in an epoch can be shuffled and still maintain memory consistency. Therefore, invalidated or evictions to a cache line in a same epoch as a load that accesses that cache line does not violate memory consistency and does not require the load to be re-executed in the event that the cache line has been invalidated or evicted in the same epoch as the load. The systems and methods maintain memory consistency by including a cache load backup system that provides for backup to a backup point if an executed load instruction has been invalidated in a prior epoch. If a cache line has been invalidated in a prior epoch, the cache line has been modified by another processor in the system in the prior epoch. The systems and methods maintain memory coherency by including a cache load backup system that provides for backup to a backup point if an executed load instruction has been determined to be non-coherent.

In one embodiment, a cache load backup system retains information associated with a backup point (e.g., a first user program instruction) in the event that an executed load instruction has been executed with a non-coherent speculative data fill. The cache load backup system can retain a backup point (e.g., a program instruction address) associated with each executed load instruction in the event that a cache line associated with the executed load instruction has been invalidated in an epoch prior to the epoch in which the executed load instruction is being retired.

Retire time for a given executed load instruction occurs when a coherent fill is returned from the multi-processor system, such that the coherency of the executed load instruction is resolved. Speculative execution of program instruction (e.g., employing speculative data fills) may be several thousand instructions ahead of an executed load instruction at retire time. Furthermore, the cache line associated with the speculative data fill employed may be invalidated by a system probe in a prior epoch prior to retire time of an executed load instruction. Once the coherent fill is returned, the source processor can continue retiring a respective executed load instruction if the speculative data fill is the same as the coherent fill or backup and re-execute program instructions if the speculative data fill is different from the coherent fill. Proper retirement of the executed load instruction occurs if the speculative data fill associated with the executed load instruction has been determined to be coherent and a cache line associated with the speculative data fill has not been invalidated in a prior epoch at retire time.

The systems and methods can operate in a multi-processor communication system that employ a coherent signal that is a separate indicator from a data fill associated with a response to a source request. The coherent signal indicates which of one or more copies of a data fill returned in response to a source request is a coherent copy of the data. A coherent copy of data is a copy that is determined to be the latest or most up to date version.

FIG. 1 depicts an example of a system 10 that can employ speculative data fills and backup to facilitate processor execution speed. Additionally, the system 10 can utilize a coherent signal to indicate which portion (e.g., field, block, quantum) of a given data fill is coherent. Furthermore, the system 10 can employ a coherent signal to indicate which of a plurality of responses to a plurality of requests have returned coherent copies of data fills. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)). The memory 16 can include a directory 26.

The processors 12-14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22-24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to guarantee coherence of data. The cache coherency protocol of the system 10 utilizes a plurality of states to identify the state of each memory block stored in a respective cache line and the memory 16. The coherency protocol establishes rules for transitioning between states, such as if data is read from or written to memory 16 or one of the caches 22-24.

As used herein, a node that issues a source request, such as a read or write request, defines a source node. Other nodes within the system 10 are potential targets of the request. Additionally, each memory block in the system 10 can be assigned a "home node" that maintains necessary global information and a data value for that memory block. The home node can be defined as a processor (or central processing unit), associated cache and associated memory/directory.

For example, when a source node, such as the processor 12, requires a copy of a given memory block, it typically first requests the memory block from its local, private cache by identifying the address associated with the memory block. If the data is found locally, the memory access is resolved without communication via the system interconnect 18. Where the requested memory block is not found locally, the source node 12 can request the memory block from the system 10, including the memory 16. In addition to the request identifying an address associated with the requested memory block, the request usually identifies the type of request or command being issued by the requester.

By way of example, assume that the processor 12 (a source node) requires a copy of data associated with a particular address, and assume that the data is unavailable from its own local cache 22. Since the processor 12 is unable to access the data in its local cache 22, the processor 12, as the source node, transmits a source request to other nodes and memory 16 via the system interconnect 18. For example, the request can correspond to a source read request for a memory block associated with the address identified in the request. The request also can identify what type of request is being issued by source node 12.

In a directory based cache coherency protocol, the source request is transmitted from the source processor 12 to a home node in the system 10. The home node retains location information (e.g., in a directory) of the owner of the requested cache line. The home node provides a forward signal to the owner. The owner then responds with a coherent data fill, which is received by the requester. The system 10 can also return a coherent signal indicating that the coherent data fill is the coherent copy of the requested cache line. The coherent signal can be provided before, after or concurrently with the coherent data fill. Based on the type of request, the cache coherency protocol can continue executing to change states of one or more copies of the memory block in the system.

During execution of the cache coherency protocol, the requesting node is provided with one or more data fills associated with the memory block. The data fill is a copy of the memory block associated with a requested cache line. The data fill can be a speculative data fill. A speculative data fill is a data fill that may or may not be the latest version of the memory block. Speculative data fills can be provided by a local cache, a local processor (e.g., within a multi-processor group), a remote processor, a home node or a speculative guess structure. The speculative guess structure can be implemented by employing a speculative table, speculative engine or separate cache structure that maintains speculative copies of memory blocks. The speculative data fills allow the requesting processor to execute several thousands of program instructions ahead prior to receiving a coherent copy of the requested memory block.

Subsequent data fills can be provided to the requesting node until the coherent signal is received indicating which data fill is coherent. These subsequent data fills can be ignored. Alternatively, if the subsequent data fill is different from the speculative data fill used by the source processor to continue execution, the processor can backup and re-execute program instructions. This may be the case if it is determined that a subsequent fill is more likely coherent than the original fill employed by the processor to continue execution.

Once the coherent signal is received, the source processor can determine whether the current speculative data fill employed by the processor to continue execution is the same as the coherent data fill. If the coherent data fill is different from the speculative data fill, the processor can back up and re-execute program instructions with the new data. If the coherent data fill is the same as the speculative data fill, the processor can continue execution, thus mitigating latency caused by the processor remaining in an idle state until a coherent version of the requested memory block is received. The source then backs up and begins executing again with the new data, but loses little or no time from the execution of the speculative data fill as the source would have remained latent during the retrieval of the coherent copy regardless. The cache coherency protocol can continue executing after the coherent copy is retrieved to change states of one or more copies of the memory block in the system based on the request (e.g., read, write) of the source.

Information associated with each source request is retained in the event of a processor backup. The source processor includes a cache system that can be set to a cache state and a register file system that can be set to a register file state associated with a processor backup state in the event of execution with a non-coherent speculative data fill. The source processor also stores information associated with the state of the program counter of the processor pipeline at a backup point. The backup point can be a first user program instruction. The first user program instruction is the first instruction that utilizes the data requested from the store or load instruction initiated by the processor pipeline.

Information associated with each executed load instruction is retained in the event of a processor backup as a result that a cache line associated with the executed load instruction has been invalidated in an epoch prior to the epoch in which the executed load instruction is being retired or executed. The cache line associated with the speculative data fill employed by the executed load instruction may be invalidated by a system probe in a prior epoch. Proper retirement of the executed load instruction occurs if the speculative data fill associated with the executed load instruction has been determined to be coherent and a cache line associated with the speculative data fill has not been invalidated in a prior epoch at retire time. In the event that the cache line has been invalidated in a prior epoch, the processor is backed up to a program instruction associated with the executed load.

Figure 2:
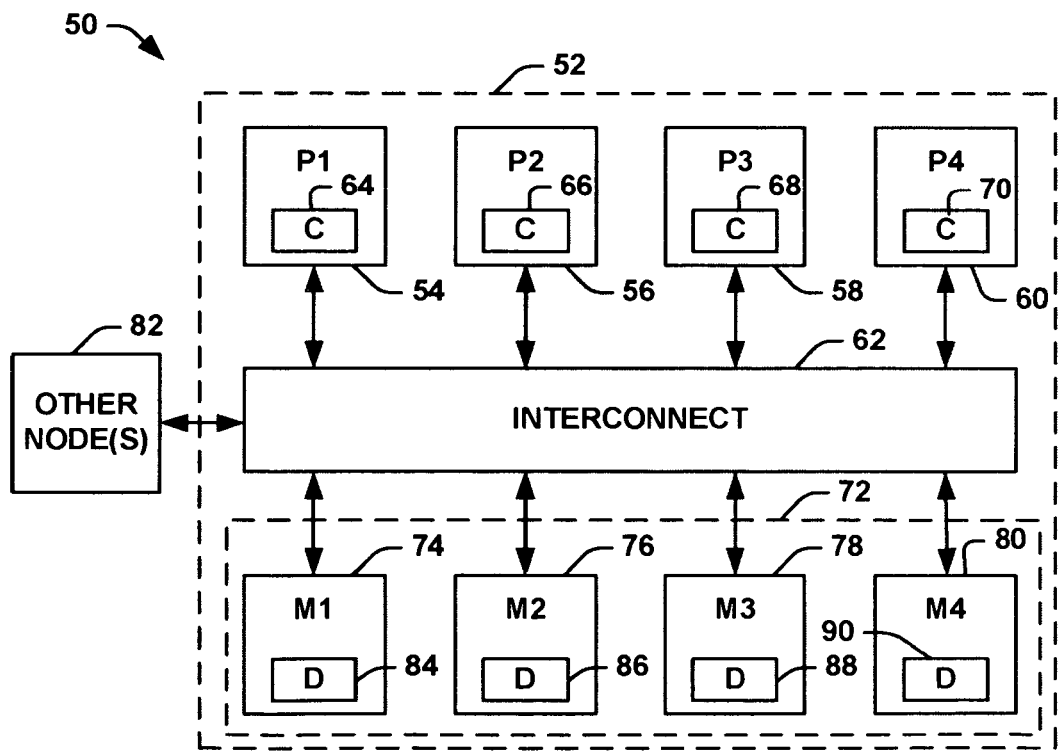
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54-60 are depicted in the example of FIG. 2, those skilled in the art will appreciate that a greater or smaller number of processors can be implemented in the node 52.

Each processor 54-60 also includes an associated cache 64, 66, 68 and 70. The caches 64-70 can enable faster access to data than from an associated main memory 72 of the node 52. The system 50 implements a cache coherency protocol designed to guarantee coherency of data in the system. By way of example, the cache coherency protocol can be implemented to include a directory based protocol in which requests for data are transmitted to a home node, which retains owner information in a directory associated with a given cache line. Alternatively, the cache coherency protocol can be implemented to include a source broadcast protocol in which a request is transmitted to all nodes in the system. Furthermore, a null-based protocol can be employed in which a home node receives a request and issues a source broadcast for the requested data.

The memory 72 can include multiple memory modules (M1, M2, M3, M4) 74, 76, 78 and 80. For example, the memory 72 can be organized as a single address space that is shared by the processors 54-60 as well as other nodes 82 of the system 50. Alternatively, each memory module 74-80 can be associated with a respective one of the processors 54-60. Each of the memory modules 72-78 can include a corresponding directory 84, 86, 88 and 90 that defines how the memory blocks are apportioned in each respective module as well as where the corresponding coherent copy of data should reside in the system 50. The coherent copy of data, for example, may reside in the home memory module or, alternatively, in a cache of one of the processors 54-60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54-60 and the memory 70, as well as those to and from the other nodes 82.

When a processor 56 requires desired data, the processor 56 operates as a source node and issues a source request (e.g., a read request or write request) to the system 50. In a directory based protocol, a home node responds to the request by providing a forwarding signal to an owner processor. The owner processor returns a coherent copy of the data fill. The cache coherency protocol implemented in the system 50 is designed to ensure that a correct copy of the data is returned in response to the source request. The system 50 can also return a coherent signal that indicates that the copy returned from the owner processor is the coherent version of the requested data.

Furthermore, the source processor can receive speculative copies or fills of the requested data in response to the source request. The source processor can employ the speculative copy to execute several thousands of instructions ahead prior to receiving a coherent version of the data. Speculative data fills can be provided by a local processor (e.g., within a multi-processor group), a remote processor, a home node or a speculative guess structure, such as a speculative table, speculative engine or separate cache structure that maintains speculative copies of memory blocks. Subsequent data fills can be provided to the requesting node until the coherent signal is received indicating which data fill is coherent. These subsequent data fills can be ignored. Alternatively, if a subsequent data fill is different from the speculative data fill used by the source processor to continue execution, the processor can backup and re-execute program instructions. This may be the case if it is determined that a subsequent fill is more likely coherent than the original fill employed by the processor to continue execution.

Each processor retains backup information associated with each source request in the event of a processor backup. Additionally, each processor retains backup information associated with each executed load instruction in the event that it is determined that a cache line associated with the executed load instruction has been invalidated in a prior epoch. Each processor includes a cache system and a register file system that can be set to a state associated with a processor backup state in the event of execution with a speculative data fill that is non-coherent, or an executed load instruction that has been provided with speculative data fill data that is associated with a cache line that has been invalidated in a prior epoch.

Once a coherent data fill is received in response to a source request, the source processor can determine whether the current speculative data fill employed by the source processor is the same as the coherent data fill to continue retirement of associated executed load instructions. If the coherent data fill is different from the speculative data fill, the processor can back up and re-execute program instructions with the new data. The processor can backup its associated pipeline by backing up the program counter to the first user program instruction, setting the cache to a backup point via a backup pointer or index to the cache backup system, and setting the register file to a backup point via a backup pointer or index to the register file backup system. Additionally, loaded register files can be reloaded with the coherent fill data.

If the coherent data fill is the same as the speculative data fill, the processor continues retirement of any associated executed load instruction that employ the speculative data fill. Proper retirement of the executed load instruction occurs if the speculative data fill associated with the executed load instruction has been determined to be coherent and a cache line associated with the speculative data fill has not been invalidated in a prior epoch at retire time. In the event that the cache line has been invalidated in a prior epoch, the processor is backed up to a program instruction associated with the executed load.

In an alternate embodiment, a comparison is performed between bytes of the coherent data fill and the speculative data fill that are employed by the processor pipeline. If none of the bytes employed by the processor pipeline are different between the speculative data fill and the coherent data fill, the coherent data fill is loaded into the local cache and the processor continues retirement of executed load instructions. If bytes employed by the processor pipeline are different between the speculative data fill and the coherent data fill, the coherent data fill is loaded into the local cache and a backup to a first user program instruction occurs.

Figure 3:
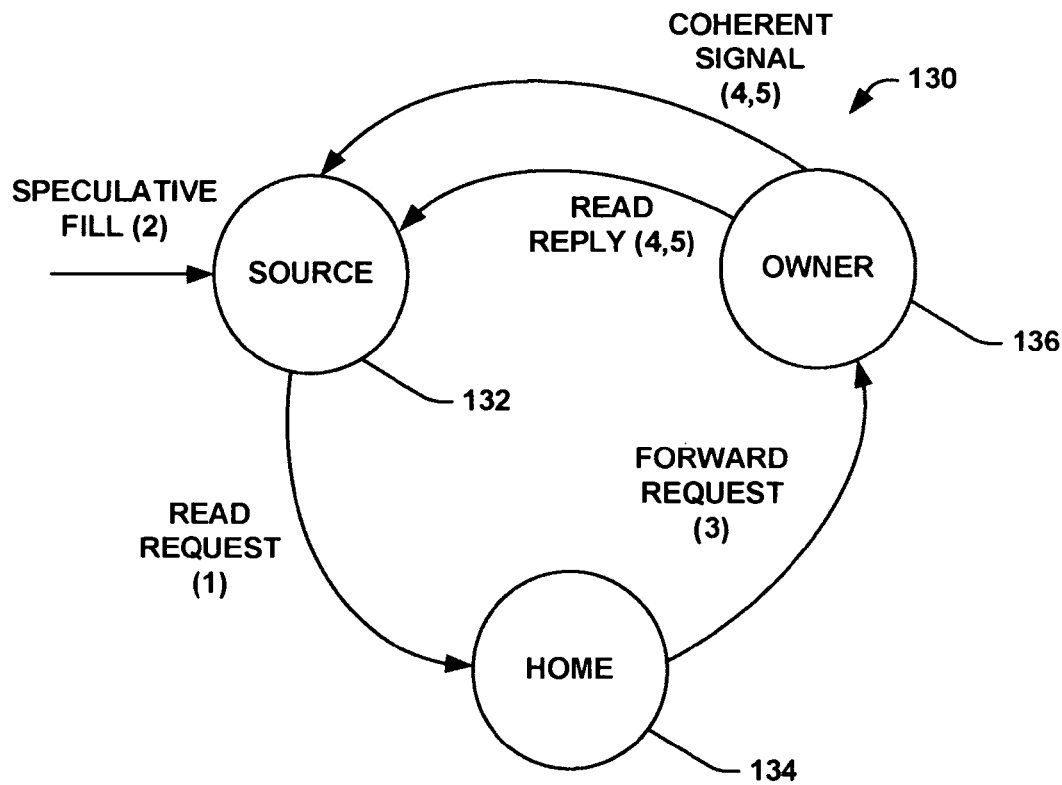
FIG. 3 illustrates a system diagram associated with a source read request.

FIG. 3 illustrates a system diagram 130 associated with a source read request in the event of a cache miss in a multi-processor system. The system diagram includes reference numerals (1-5) that indicate one or more communication orders associated with the system diagram. A source node or processor 132 initiates a read request, which is received by a home node 134. The home node 134 retains information indicating the owner of the requested cache line.

This information is stored in a directory in memory associated with the home node 134. The source read request is also received by one or more other entities and/or structures of the multi-processor system. For example, one or more local processors (e.g., a processor part of a multi-processor group or node), a remote processor, or some other local or remote structure residing in a multi-processor group with the source. At least one or more of these other entities and/or structures provide copies of the requested cache line to the source. The copies of the requested cache line are referred to as speculative data fills, since it is not known at this time whether or not these copies are coherent. One of the speculative data fills are employed by the source processor to continue executing its program instructions. The source processor also retains information to allow the processor pipeline to backup to a previous processor execution state in the event the speculative data fill employed by the processor pipeline is non-coherent.

The multi-processor system continues execution of its cache coherency protocol, while the source processor executes with the speculative data fill. The home node 134 determines the owner 136 of the cache line requested from a home directory. The owner 136 of the cache line is the node or processor that has the latest version of the cache line. The latest version of the cache line can reside in a cache associated with a local or remote processor, or the latest version of the cache line can reside in memory. The owner can be a cache associated with a processor or a memory associated with the system or one or more processors. The home node 134 then provides a forward request to the owner 136. The owner 136 provides a read reply by providing a coherent copy of the requested data associated with the requested cache line to the source 132.

A coherent signal is provided to the source. The coherent signal is an indicator that provides an indication to the source that the copy provided by the owner is the coherent version of the cache line. In the example of FIG. 3, the coherent signal is provided by the owner. However, the coherent signal can be provided by control logic associated with the multi-processor system, by the home node 136 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

In response to the source receiving the coherent signal, a comparison is performed of the coherent fill and the speculative data fill employed by the source to continue program execution. If the coherent data fill is different from the speculative data fill, the source can back up the program counter to the first user program instruction, reset the cache, register files and register map, reload the registers associated with the requested data and re-execute program instructions with the new coherent data. If the coherent data fill is the same as the speculative data fill, the source can continue retiring executed load instructions, which can be several thousand instructions ahead of where the program would be without employing the speculative data fill. Proper retirement of the executed load instruction occurs if the speculative data fill associated with the executed load instruction has been determined to be coherent and a cache line associated with the speculative data fill has not been invalidated in a prior epoch. In the event that the cache line has been invalidated in a prior epoch, the processor is backed up to a program instruction associated with the executed load.

Alternatively, a comparison can be performed between bytes of the coherent data fill and the speculative data fill that are employed by the processor pipeline. If none of the bytes employed by the processor pipeline are different between the speculative data fill and the coherent data fill, the coherent data fill is loaded into the local cache but no backup occurs. If bytes employed by the processor pipeline are different between the speculative data fill and the coherent data fill, the coherent data fill is loaded into the cache and a backup occurs.

Figure 4:
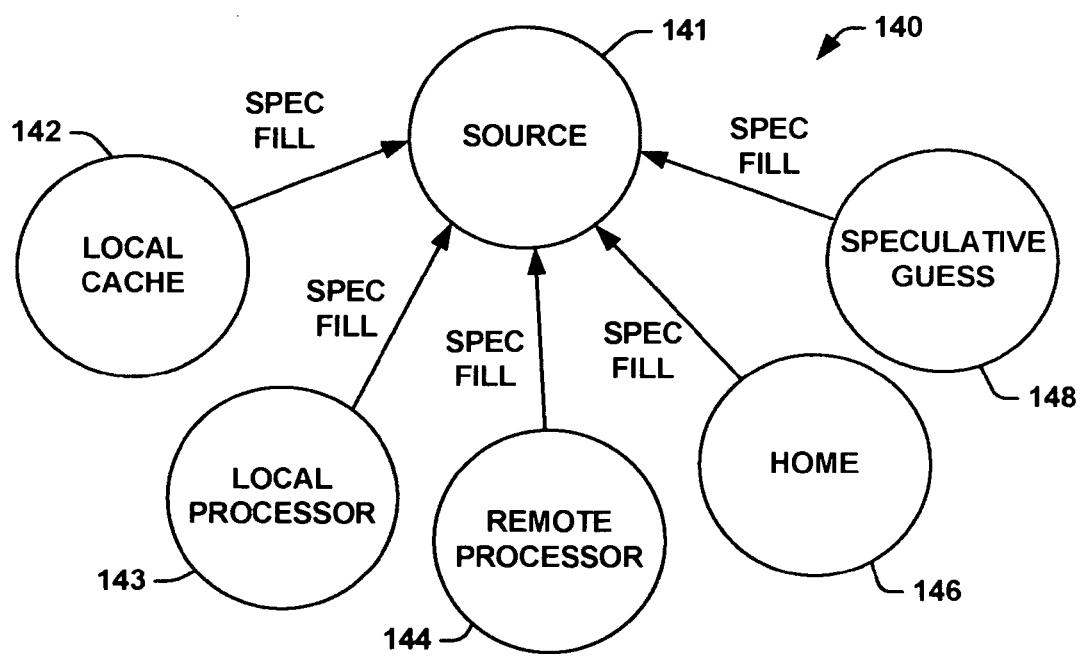
FIG. 4 illustrates a system diagram associated with a source node or processor receiving speculative data fills.

FIG. 4 illustrates a system diagram 140 associated with a source node or processor 141 receiving speculative data fills in response to a source request in the event of a cache miss in a multi-processor system. The source node or processor 141 can receive speculative data fills from a local cache 142. The local cache 142 may have a copy of the memory block, which may or may not be the same as the coherent version residing somewhere in the multi-processor. This can occur in an upgrade miss, which by definition means that there is already a copy of the memory block in the local cache 142, such that the copy of the memory block can serve as a speculative data fill. When the upgrade miss returns, a coherent signal will occur if the upgrade occurred to the value that was already present in the cache. If a new value is obtained, the new value will cause the source 141 to backup and re-execute program instruction with the new value.

Another example, is a full-block write where by definition all data values in a memory block associated with a cache line are going to be written by the execution stream. In this example, the system returns an acknowledgement that the line is coherent (all other copies have been invalidated). Similar to upgrade misses, the source begins executing upon receiving a full-block miss. When the system returns a coherent signal, the coherent signal is passed to the source 141 to allow instructions to start retiring.

The source node or processor 141 can receive speculative data fills from a local processor 143. A local processor 143 is a processor that is within a node or multi-processor group with the source 141. The local processor 143 may have a copy of the cache line in its cache, which may be a stale version or a coherent version. The local processor 143 can provide this copy in the form of a speculative data fill to the source. Additionally, a speculative data fill can be provided by a remote processor 144 that can provide a speculative data fill prior to the time necessary in providing the coherent fill. A remote processor is a processor that is not within a node or multi-processor group with the source 141. A home node 146 or processor can also provide a speculative data fill.

The multi-processor system can also include a speculative guess structure 148 operative to provide speculative data fills. For example, the speculative guess structure 148 can be a speculative engine can be employed to provide speculative data fills in response to source requests. The speculative engine can be a dedicated processor and/or memory that returns speculative copies of cache lines. The speculative guess structure 148 can be a storage structure local to the source processor 141 that maintains speculative copies of cache lines in a table or some other form. The speculative guess structure 148 can monitor cache copies transmitted over the system, such that the speculative data fills are similar to a substantial portion of the coherent fills transmitted over the system.

Figure 5:
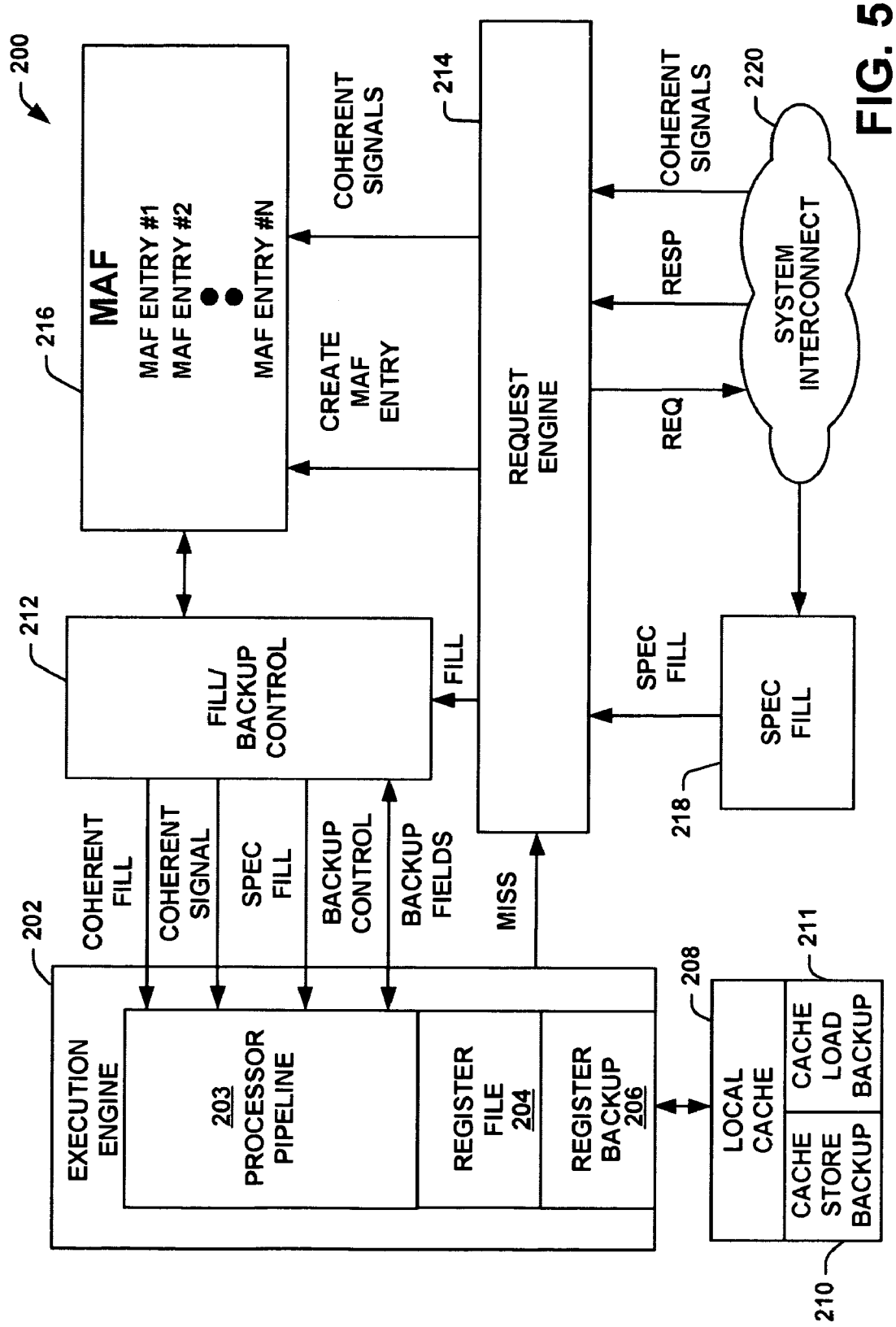
FIG. 5 depicts an example of a processor system.

FIG. 5 illustrates a processor system 200 for executing program instruction past memory barriers in a multi-processor system. The system 200 includes an execution engine 202 that is executing instructions associated with a processor pipeline 203. During a load or store instruction, the execution engine 202 searches a local cache 208 to determine if the cache line associated with the load or store instruction resides in the local cache 208. If the cache line does not reside in the local cache 208, the execution engine 202 initiates a cache miss to a request engine 214. The request engine 214 determines if a previous MAF entry resides in a MAF 216. The MAF 216 can include N MAF entries, where N is an integer greater than or equal to one. Each MAF entry is associated with a source request for a cache line.

If a MAF entry associated with the cache line corresponding to the load or store instruction resides in the MAF 216, a previous unresolved source request has been issued over the system. If a MAF entry associated with the cache line corresponding to the load or store instruction does not reside in the MAF 216, the request engine 214 creates a new MAF entry and issues a source request over the system via a system interconnect 220. A MAF can be implemented as a table, an array, a linked list or other data structure programmed to manage and track requests for each cache line. The MAF entry includes fields that identify, for example, the address of the data being requested, the type of request, and response information received from other nodes in response to the request. The request engine 214 thus employs a MAF 216 having one or more MAF entries to manage requests issued by the request engine 214 as well as responses to such requests.

The MAF entry associated with a given source request also includes fields for initiating a backup of a processor pipeline 203 in the event that a speculative data fill employed by the processor pipeline 203 is determined to be non-coherent. The MAF entry includes a MAF entry live flag field. The MAF entry live flag indicates that a first user program instruction has been encountered by the processor pipeline 203. The first user program instruction is the first instruction that employs the requested data. The MAF entry also includes an index into a cache store backup system 210. The cache store backup system 210 is operative to set the local cache to a backup point associated with the first user program instruction in the event that a speculative data fill associated with an executed store instruction has been determined to be non-coherent. The MAF entry also includes an index into a register file backup system 206. This index can be a pointer into a log or a register backup file associated with the state of a register file 204 at a processor execution backup point. The MAF entry also includes the address of the first user program instruction. The address of the first user program instruction can be employed to backup the program counter to the first user program instruction.

A speculative data fill is provided to the request engine 214 by a speculative data fill structure 218 in response to a source request. The speculative data fill structure 218 can be a tagless relatively large cache-like structure local or remote to the system 200. If the speculative data fill structure 218 has a substantial number of entries (e.g., 32 times more entries than the local cache 204), the speculative data fill structure 218 will have relatively good accuracy and a large number of speculative data fills will be coherent. The entries in the speculative data fill structure can be obtained by monitoring cache lines transmitted over the multi-processor system.

The speculative data fill is stored in a copy of latest fill block field in the MAF entry associated with the corresponding source request via the request engine 214. A fill/backup control system 212 retrieves a copy of the speculative data fill from the MAF entry and provides the speculative data fill to the processor pipeline 203. The processor pipeline 203 employs the speculative data fill to continue execution of program instructions. As new fills are received from the system, the fill/backup control system 212 compares the new fills with the copy of latest fill block field of the MAF entry. If the new fill is different then the copy of the latest fill is overwritten with the new fill. These subsequent data fills can be ignored by the processor pipeline, until a coherent signal is received. Alternatively, if the subsequent data fill is different from the speculative data fill used by the source processor to continue execution, the processor can backup and re-execute program instructions. This may be the case if it is determined that a subsequent fill is more likely coherent than the original fill employed by the processor to continue execution.

The fill/backup control system 212 also provides an interface between the processor pipeline 203 and the MAF entry. The fill/backup control 212 analyzes the processor instructions and updates backup fields associated with the MAF entry. For example, the fill/backup control system 212 will receive backup field updates such as the address of the first user program instruction for an associated source request. The fill/backup control system 212 will store the address of the first user program instruction in the first user program instruction field and set the MAF entry live flag. The MAF entry live flag provides an indication that the first user program instruction has been encountered and that a coherent fill that does not match the speculative data fill will cause a processor execution backup to an execution state associated with the first user program instruction.

The fill/backup control system 212 monitors a coherent flag field in the MAF entry to determine if the coherent flag has changed state, which is an indication that the coherent signal has been received. Once the coherent signal is received from the system, the request engine 214 changes the state of the coherent flag field in the MAF entry.

The fill/backup control system 212 detects the change in the state of the coherent fill and retrieves a copy of the latest fill block, which corresponds to the coherent version of the data fill. The fill/backup control system 212 then compares the speculative data fill provided by the fill/backup control system 212 to the processor pipeline 203 with the coherent fill.

If the coherent data fill is different from the speculative data fill and the MAF entry live flag is set, the fill/backup control system 212 provides the coherent fill to the processor pipeline 203. The fill/backup control system 212 then resets the program counter with the first user program instruction address, sets the cache backup system 210 to a cache state associated with the first user program instruction via the index into the cache store backup system 210, sets the register file 204 to a register file state associated with the first user program instruction via the index into the register file backup 206 and loads the new fill into the local cache 208. The processor pipeline 203 can then begin executing program instructions again with the new coherent data.

The system 200 also includes a cache load backup system 211. The cache load backup system allows the processor pipeline to execute program instruction past memory barriers without violating the memory consistency associated with the multi-processor system. The cache load backup system 211 retains entries associated with executed load instructions and memory barrier or fence instructions. If the coherent data fill is the same as the speculative data fill, the fill/backup control system 212 provides the coherent signal to the processor pipeline 203 indicating that the processor pipeline 203 has already been provided with the coherent data. The cache load backup system 211 will then begin to retire executed load instruction corresponding to the coherent data, and any additional executed load instructions that are a result of a cache hit within the sequence of executed load instructions. As executed load instructions are retired (e.g., all prior memory reference instructions have accessed coherent data), the cache load backup system 211 will specify if the cache line associated with the execution of the memory load instruction has been invalidated and in which epoch the invalidation has occurred. The memory reference entries associated with the fence instructions are employed to increment a retire time epoch counter which determines the epoch that executed instructions are currently being retired.

If a cache line has not been invalidated or if a cache line has been invalidated in the same epoch as the executed instruction, the associated executed load instruction is retired and the processor pipeline 203 can continue execution. If a cache line has been invalidated in a different epoch as the executed instruction, the processor pipeline 203 is reset to a state associated with a program instruction address of the executed load instruction.

Figure 6:
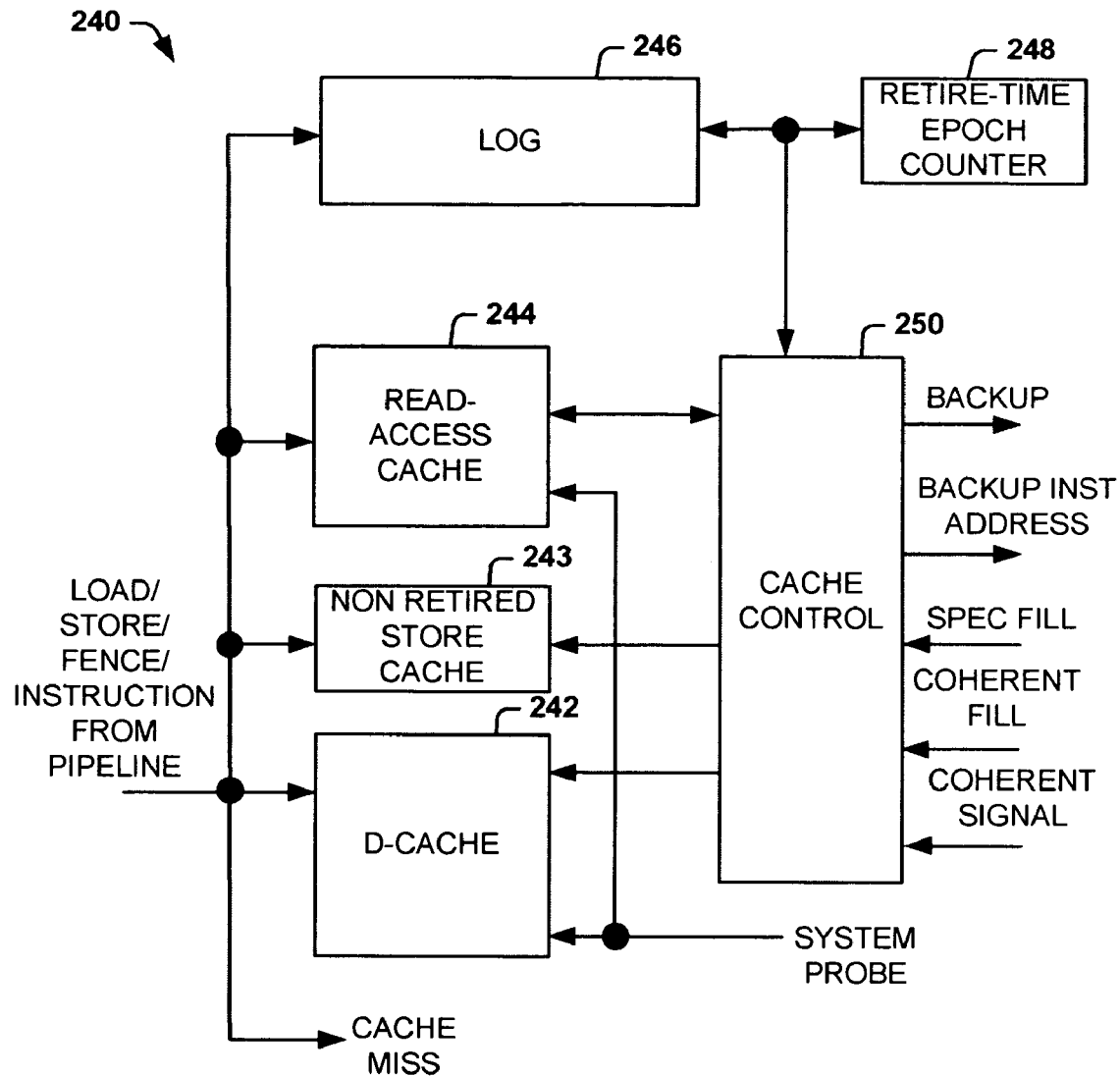
FIG. 6 illustrates a block diagram of a cache load backup system.

FIG. 6 illustrates a cache load backup system 240 that may provide for executing past memory barriers. The cache load backup system 240 includes a read-access cache 244, a log 246 and a retire time epoch counter 248. A pipeline (not shown) executes program instruction in which information associated with executed load instructions are recorded in a read-access cache 244. The read-access cache 244 has a cache line load entry associated with each cache line that is subject to an executed load instruction. An executed load instruction is an instruction that results in a cache miss, and executes with data associated with a speculative data fill.

For example, the processor pipeline (not shown) will search an associated data cache 242 to determine if data associated with the load instruction resides in the data cache 242. If the data associated with the load instruction does not reside in the data cache 242, a cache miss initiates a source request for the cache line across a multi-processor system. Additionally, a speculative data fill associated with the requested data is provided to a cache control 250. The cache control 250 loads the speculative data fill into the data cache 242 to be employed by the processor pipeline.

An executed load entry is stored in the log 246 for each executed load instruction. The corresponding cache line load entry in the read-access cache 244 includes a counter that is incremented each time an executed load associated with a respective cache line is executed and added to the log 246, and decremented each tine an executed load associated with a respective cache line is retired and removed from the log 246. An executed load entry is retired when it is determined that all prior memory references have accessed coherent lines and the present executed load entry has been executed with coherent data, and the cache line associated with the executed load instruction has not been invalidated by a system probe in a prior or different epoch.

As the processor pipeline encounters memory barrier or fence instructions, a memory barrier entry is entered in the log 246. As memory barrier entries are retired from the log 246, a retire time epoch counter 248 is incremented. The retire time epoch counter 248 maintains a count of the epoch in which instructions are currently being retired (e.g., coherent time). An epoch is defined as a portion of code between two memory barriers. If a system probe invalidates a cache line (e.g., as a result of a write at another processor), an invalled flag is set in the cache line load entry of the associated cache line in the read-access cache 244 and an invalidated epoch counter field is set with the value of the retire time epoch counter 248 at the time of the invalidation. Additionally, the cache line in the data cache 242 is invalidated. If a coherent signal is returned to the cache control 250 indicating that a speculative data fill is determined to be coherent, executed load instructions associated with the speculative data fill will begin to retire from the log 248.

Prior to retiring the executed load instruction from the log 248, the cache control 250 will check the associated cache line load entry in the read-access cache 244 to determine if the cache line has been invalidated. If the cache line has been invalidated, the value of the invalidated epoch counter is compared with the value of the retire time epoch counter 248. If the values are the same, the associated executed load instructions are retired (e.g., removed from the log), and the counter in the cache line load entry is decremented. If the values are not the same, the cache control 250 initiates a backup and provides a backup instruction address to the program counter of the processor pipeline, which is the address of the executed load instruction that is being retired associated with the cache line that has been invalidated. The log 246 and the read-access cache 244 are flushed. The register file (not shown) and the data cache 242 are set to a state associated with the address of the executed load instruction, and the processor pipeline re-executes program instructions from address of the executed load instruction.

The cache load backup system 240 can also include a non-retired store cache 243. The non-retired store cache 243 can be employed for storing cache line data associated with executing store instructions. Load instructions can read data from a cache line from both the non-retired store cache 243 and the data cache 242 if the cache line resides in both the non-retired store cache 243 and the data cache 242. The data from the non-retired store cache 243 is selected over the data cache 242 to continue execution. The log 246 can also include executed store instructions. The executed store instructions are retired as a coherent signal returns indicating that the data associated with the executed store instruction is coherent.

If a coherent signal is returned with a coherent fill indicating that the speculative data fill associated with a store and/or load instruction is non-coherent, the cache control 250 will initiate a backup to a backup instruction address associated with a first user program instruction. Entries from the log are retired to the backup instruction address, such that the data cache is set to a backup point associated with the first user program instruction. The log 246 and the read-access cache 244 are flushed, and the data cache 242 and the register file (not shown) is set to a backup point associated with the first user program instruction address, such that the processor pipeline can re-execute program instructions from the first user program instruction address.

Figure 7:
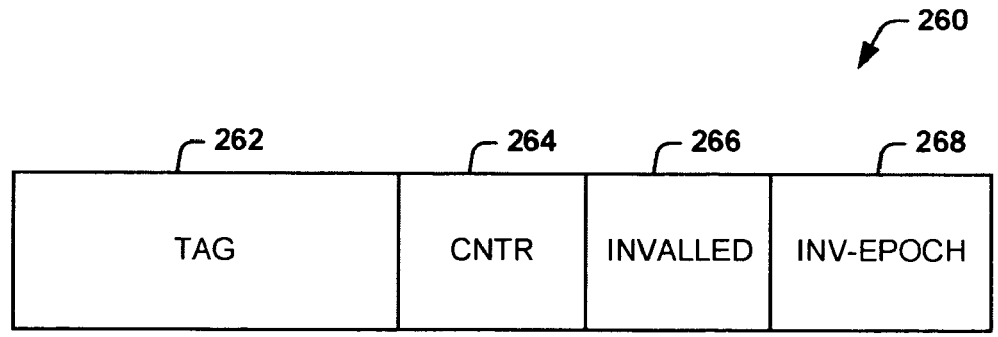
FIG. 7 illustrates a cache line load entry of a read-access cache.

FIG. 7 illustrates a cache line load entry 260 of a read-access cache. The cache line load entry includes an address field 262 associated with the address of the cache line being requested for an executed load instruction. The cache line load entry 260 also includes a counter 264 that maintains a count of executed load entries in the log that have not been retired. The counter is incremented as a executed load entry is added to the log, and the counter is decremented as an executed load entry is retired and removed from the log. The cache line load entry 260 also includes an invalled flag 266. The invalled flag 266 is set if a system probe has invalidated the cache line associated with the cache line load entry 260. A cache line may be invalidated when another processor in the system requests write access to the cache line. The cache line load entry 260 also includes an invalidated epoch counter 268 that retains the value of the retire time epoch counter when the respective cache line is invalidated. This value can be compared to the value of the epoch counter at the time an executed load instruction is being retired.

Figure 8:
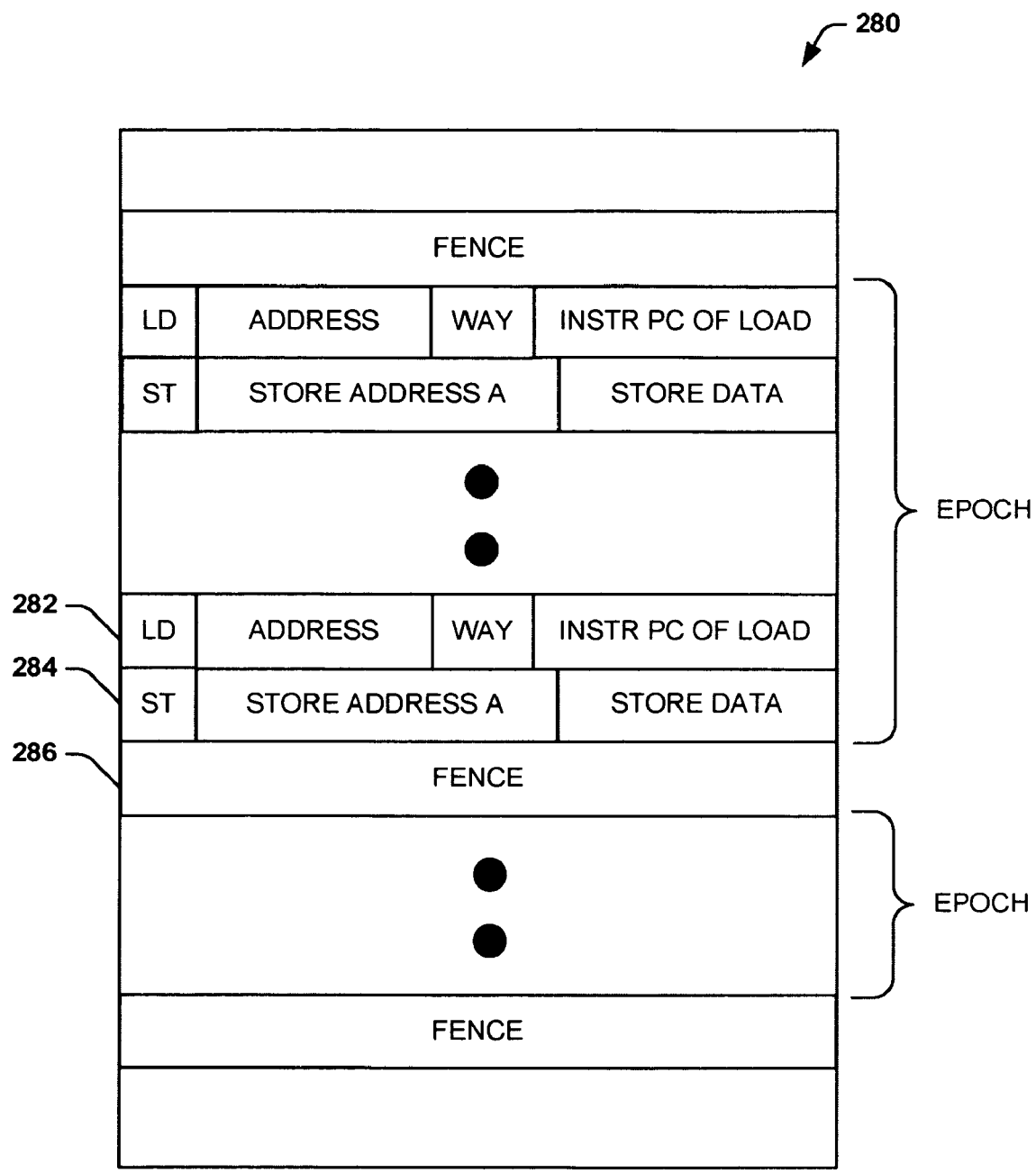
FIG. 8 illustrates a log associated with a cache load backup system.

FIG. 8 illustrates a log 280 associated with a cache load backup system. The log 280 includes executed load entries 282, executed store entries 284 and memory barrier or fence entries 286. Each executed load entry 282 includes a load field that specifies that the log entry is an executed load entry, an address field that stores the address that the load instruction is accessing, and a way field that retains the way in the data cache that the cache line is located. The executed load entry 282 also includes the program instruction address of the load. The program instruction address of the load is employed to reset the program counter of the processor pipeline in the event that a cache line associated with a load has been invalidated in a previous epoch. Re-execution of the program from the load instruction address preserves memory consistency associated with the multi-processor system. The executed store entry 284 includes a store field that specifies that the log entry is an executed store entry, an address field that stores the address that the store instruction is accessing, and store data associated with the executed store entry.

The fence or memory barrier entry 286 is a single field that indicates that the program has encountered a fence or memory barrier instruction. As fence entries 286 are retired from the log, an epoch counter is incremented to provide an indication of which epoch executed instruction are currently being retired. As illustrated in FIG. 8, an epoch is a portion of code between two subsequent fences.

Figure 9:
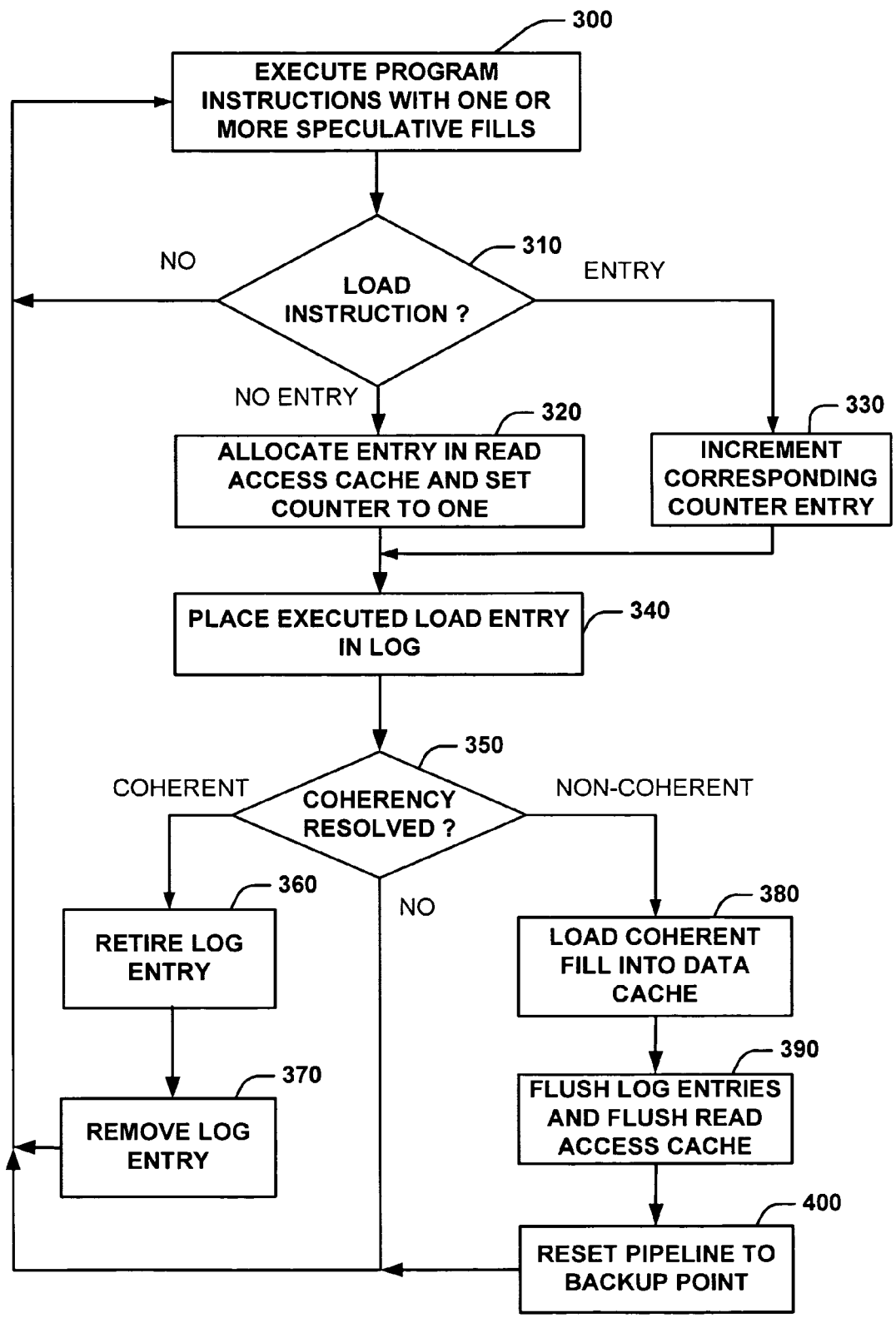
FIG. 9 depicts a method employing a speculative data fill in the event of a local cache miss in a multi-processor system.
Figure 10:
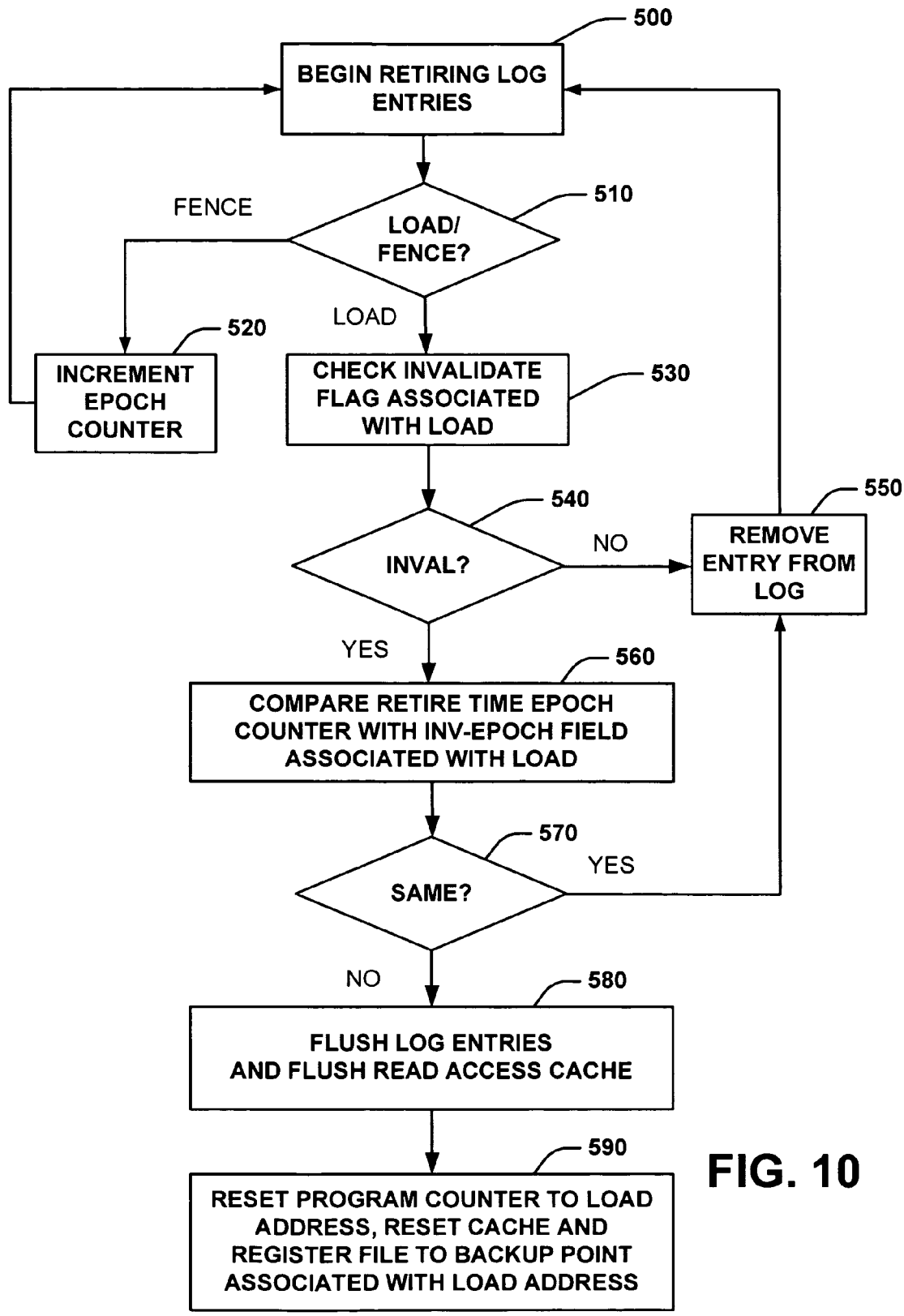
FIG. 10 depicts a method for retiring executed instructions.
Figure 11:
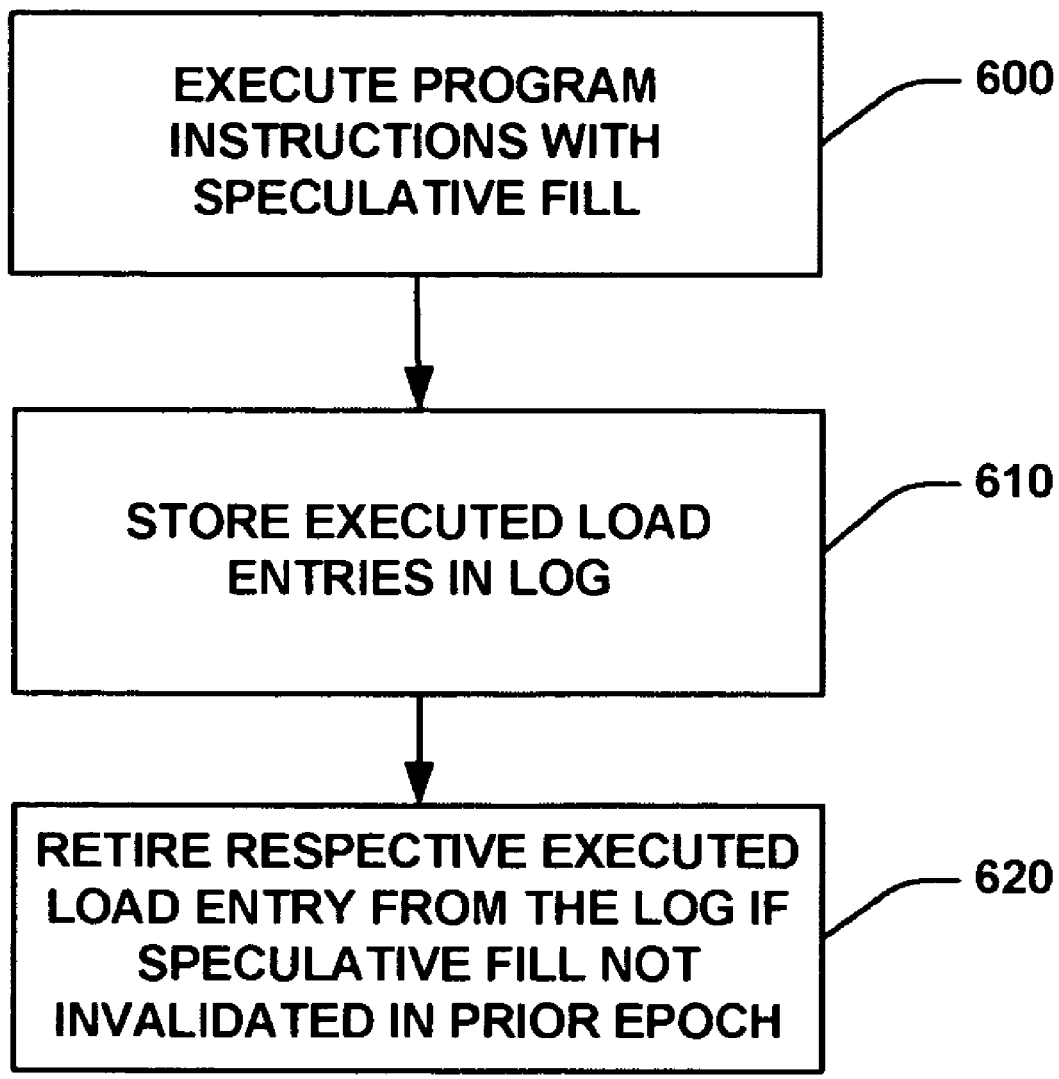
FIG. 11 depicts a flow diagram illustrating a method for executing program instructions employing a speculative data fill across memory barriers in a multi-processor system.

In view of the foregoing structural and functional features described above, certain methods will be better appreciated with reference to FIGS. 9-11. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 9 depicts a method employing a speculative data fill in the event of a local cache miss in a multi-processor system. At 300, program instructions are executed with one or more speculative data fills. Speculative data fills are employed when a source request is transmitted by a source node or processor in the event of a cache miss caused by a load or store instruction of a processor pipeline. The source processor can receive speculative data fills from a local processor (e.g., a member of a multi-processor group), or a remote processor (e.g., non-member of a multi-processor group). The speculative data fill can also be provided by a speculative guess structure operative to provide speculative data fills, such as a speculative engine (e.g., dedicated processor and/or memory) that returns speculative copies of cache lines. The speculative guess structure can be a storage structure local to the source processor that maintains speculative copies of cache lines in a table or some other form. The methodology then proceeds to 310.

At 310, the methodology determined if an executed load instruction has been encountered. If an executed load instruction has not been encountered, the methodology returns to 300 to continue program instructions with one or more speculative data fills. If an executed load instruction has been encountered at 310, it is determined if an cache line load entry exists in a read-access cache for the corresponding cache line associated with the executed load instruction. If a cache line load entry does exist in the read-access cache (ENTRY), the methodology proceeds to 330 to increment a corresponding counter in the cache line load entry. If a cache line load entry does not exist in the read-access cache (NO ENTRY), the methodology proceeds to 320 to allocate a new cache line load entry in the read-access cache and set the corresponding counter in the new allocated cache line load entry to one. The methodology proceeds to 340 to place an executed load entry in the log. The methodology then proceeds to 350.

At 350, coherency associated with the executed load entry is resolved. If the speculative data fill associated with the executed load entry is coherent, the methodology proceeds to 360 to begin to retire the executed load entry. Retiring of the executed load entry includes determining if the cache line has been invalidated in a previous epoch. If the cache line has been invalidated in a previous epoch, the methodology backs up the processor pipeline to a load instruction address associated with the executed load entry and re-executes the program from the load instruction address. If the cache line has not been invalidated in a previous epoch, the methodology retires the instruction, removes the executed load entry from the log and decrements the counter in the cache line load entry in the read-access cache at 370.

If the speculative data fill associated with the executed load entry is determined to be non-coherent at 350, the methodology proceeds to 380. At 380, a coherent data fill is loaded into the data cache. At 390, entries are flushed from the log and entries are flushed from the read-access cache. The methodology then proceeds to 400 to reset the processor pipeline to a backup point (e.g., first user program instruction). The methodology then returns to 300 to continue executing program instruction with one or more speculative data fills.

FIG. 10 depicts a method for retiring executed instructions. At 500, the methodology begins retiring executed load entries in the log. At 510, the methodology determines if the entry in the log is a fence entry or an executed load entry. If the methodology determines that the log entry is a fence entry (FENCE), the epoch counter is incremented at 520. The methodology then returns to 500 to begin retiring new log entries. If the methodology determines that the log entry is a executed load entry, the methodology proceeds to 530.

At 530, the methodology checks the invalidated flag in the cache line entry of the read-access cache associated with the executed load entry. At 540, it is determined if invalidated flag is set. If the invalidated flag is not set (NO), the methodology proceeds to 550. At 550, the executed load entry is removed from the log. The methodology then returns to 500 to begin retiring log entries. If the invalidated flag is set (YES) at 540, the methodology proceeds to 560. At 560, a retire time epoch counter is compared with an invalidated epoch counter in the cache line load entry of the read-access cache associated with the executed load entry. At 570, it is determined if the retire time epoch counter value is the same as the invalidated epoch counter value. If the retire time epoch counter value is the same as the invalidated epoch counter value (YES), the methodology proceeds to 550 to remove the executed load entry from the log and retire the instruction. If the retire time epoch counter value is not the same as the invalidated epoch counter value (NO), the methodology proceeds to 580.

At 580, the log entries are flushed and the read-access cache is flushed. The methodology then proceeds to 590. At 590, the program counter of the processor pipeline is reset to the instruction address associated with the executed load instruction. The data cache is set to a backup point state associated with the executed load instruction, and the register file is set to a backup point state associated with the executed load instruction FIG. 11 depicts a method for executing program instructions employing a speculative data fill in a multi-processor system. At 600, program instructions are executed with data from a speculative data fill that is provided in response to a source request across at least one memory barrier. At 610, executed load entries are stored in a log. Each of the executed load entries comprises a load address and a program instruction address associated with a respective executed load instruction. At 620, a respective executed load entry is retired from the log if a cache line associated with the speculative data fill has not been invalidated in an epoch that is prior to an epoch in which the executed load instruction is executed.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
   a processor that transmits a source request for a data fill associated with a cache line in response to a cache miss, the processor having a processor pipeline that executes program instructions across at least one memory barrier with data from speculative data fills received from one or more other processors of the multi-processor system in response to one or more source requests, a speculative data fill being a copy of a requested data fill that has an undetermined coherency state, wherein the processor pipeline receives a coherent data fill from the multi-processor system after a speculative data fill is received in response to the one or more source requests; and
   a log that retains executed load instruction entries associated with executed program instructions, the executed load instruction entries being retired if a cache line associated with data of a speculative data fill has not been invalidated in an epoch that is different from the epoch in which the executed load instruction is executed.

2. The system of claim 1, further comprising a read-access cache that retains a plurality of cache line load entries associated with executed load instructions in the log, each cache line load entry including a cache line address associated with load instructions requesting data from a respective cache line and a counter that is incremented each time an executed load instruction corresponding the respective cache line is added to the log and decremented each time an executed load instruction corresponding to the respective cache line is retired and removed from the log.

3. The system of claim 2, wherein a respective cache line load entry includes a tag associated with the address of the given cache line, an invalidate flag that is set if the given cache line has been invalidated and an invalidated epoch counter that retains the value of the corresponding epoch in which the given cache line has been invalidated.

4. The system of claim 1, further comprising a cache control that retires an executed load instruction from the log by verifying that the speculative data fill associated with the executed load instruction is coherent and verifying that a cache line associated with data of the speculative data fill has not been invalidated in a previous epoch from the epoch in which the executed load instruction is executed.

5. The system of claim 4, wherein the cache control initiates a backup of the processor pipeline to a first user program instruction if the speculative data fill associated with the executed load instruction is determined to be non-coherent.

6. The system of claim 4, wherein the cache control initiates a backup of the processor pipeline to a program address associated with an executed load instruction if a cache line associated with data of the speculative data fill corresponding to the executed load instruction has been invalidated in a previous epoch from the epoch in which the executed load instruction is executed.

7. The system of claim 1, further comprising an epoch counter that retains an epoch value associated with the epoch of the executed load instruction entries that are currently being retired.

8. The system of claim 7, wherein the retire time epoch counter is incremented each time a memory barrier instruction is retired from the log.

9. The system of claim 7, further comprising a read-access cache that retains a plurality of cache line load entries associated with executed load instructions in the log, each cache line load entry including a cache line address and an invalidated epoch count field, the invalidate epoch count field being set to a current value of the epoch counter if a system probe invalidates the cache line.

10. The system of claim 9, further comprising a cache control that initiates a backup to an instruction address associated with an executed load entry if it is determined that a cache line associated with data of the speculative data fill has been invalidated in a previous epoch from the epoch in which the executed load instruction is executed by comparing a value of the invalidated epoch count field with a value in the epoch counter.

11. The system of claim 1, wherein the log is a first-in-first-out (FIFO) of executed load entries and memory barrier entries that have been executed by the pipeline and not retired.

12. The system of claim 11, wherein the log further comprises a plurality of executed store entries that have been executed and not retired.

13. The system of claim 1, wherein the executed load entry comprises a program instruction address associated with a load instruction corresponding to the executed load entry and an address of the associated cache line corresponding to the data requested by the load instruction.

14. The system of claim 1, wherein the processor pipeline receives a coherent signal generated by the multi-processor system that provides an indication of which of a plurality of data fills received by the processor pipeline is a coherent data fill.

15. A processor in a multi-processor system that conforms to a cache coherency protocol, the processor comprising:
a request engine that transmits a source request for a data fill associated with a cache line in response to a cache miss;
a processor pipeline that executes program instructions with a speculative data fill across at least one memory barrier, the speculative data fill being received from one or more other processors of the multi-processor system in response to the source request, a speculative data fill being a copy of a requested data fill that has an undetermined coherency state, wherein the processor pipeline receives a coherent data fill from the multi-processor system after a speculative data fill is received in response to the source request; and
a cache load backup system operative to set the processor pipeline to a previous processor pipeline execution state associated with an executed load instruction address if data from a speculative data fill associated with the executed load instruction is determined to be invalidated in an epoch prior to an epoch in which the executed load instruction is executed.

16. The processor of claim 15, wherein the employed a cache coherency protocol causes the system to generate a coherent signal that provides an indication of which of a plurality of data fills received by the processor pipeline is a coherent data fill, the processor employing the coherent signal to determine if the speculative data fill is non-coherent.

17. The processor of claim 16, wherein the cache load backup system is operative to set the processor pipeline to a previous processor pipeline execution state associated with a first user program instruction if data from a speculative data fill associated with the executed load instruction is determined to be non-coherent, the first user program instruction corresponds to a first program instruction that employs the speculative data fill associated with the source request.

18. The processor of claim 15, wherein the cache load backup system comprises:
a log that retains executed load instruction entries associated with load instruction and memory barrier entries associated with memory barrier instructions;
a read-access cache that retains a plurality of cache line load entries associated with executed load instructions in the log, each cache line load entry including a cache line address associated with load instructions requesting data from a respective cache line and a counter that tracks the number of executed load instruction associated with the respective cache line in the log;
a cache control that retires executed load instruction if data associated with the speculative data fill associated with the executed load instruction is determined to be coherent and a cache line associated with data of the speculative data fill has not been invalidated in a previous epoch; and
an epoch counter that retains an epoch value associated with an epoch of the executed load instructions that are being retired, the epoch counter incrementing each time a memory barrier entry in the log is retired.

19. The processor of claim 18, wherein the cache line load entries include an invalidate flag that is set if the given cache line has been invalidated and an invalidated epoch counter field that retains the value of the corresponding epoch in which the given cache line has been invalidated, the cache control initiates a backup to an instruction address associated with an executed load entry if it is determined that a cache line associated with data of the speculative data fill has been invalidated in a previous epoch by comparing a value of the invalidated epoch counter field with a value in the epoch counter.

20. A multi-processor system that employs a cache coherency protocol, the system comprising:
means for transmitting a source request for a data fill with a cache line in response to a cache miss;
means for executing program instructions associated with a source processor across at least one memory barrier employing speculative data fills received from one other processors of the multi-processor system in response to one or more source requests, speculative data fills being copies of requested data fills that have undetermined coherency states, wherein the means for executing program instructions receives a coherent data fill from the multi-processor system after a speculative data fill is received in response to the one or more source requests;
means for storing executed load entries associated with executed program load instructions executed by the means for executing; and
means for retiring the executed load entries if a speculative data fill associated with the executed load entry is determined to be coherent and a cache line associated with the speculative data fill has been determined not to have been invalidated in an epoch prior to an epoch in which the executed load entry is executed.

21. The system of claim 20, further comprising means for setting the means for executing program instructions to a backup point if one of the speculative data fill has been determined to be non-coherent and the cache line associated with the speculative data fill has been determined to have been invalidated in an epoch prior to the epoch in which the executed load entry is executed.

22. The system of claim 21, wherein the means for setting the means for executing program instructions to a backup point comprises setting the means for executing program instruction to a load instruction address associated with an executed load instruction which has had a cache line that has been invalidated in an epoch prior to the epoch in which the executed load entry is executed.

23. The system of claim 21, wherein the means for setting the means for executing program instructions to a backup point comprises setting the means for executing program instruction to a first user program instruction address if a speculative data fill associated with the executed load entry is determined to be non-coherent, the first user program instruction being the first program instruction that employs data associated with the non-coherent speculative data fill.

24. The system of claim 21, further comprising means for retaining a count of executed load entries that have been executed and not retired for a respective cache line.

25. The system of claim 21, further comprising means for retaining an epoch count value associated with the executed load entries that are currently being retired and an epoch count value associated with the epoch count of the means for retaining an epoch count for a respective cache line at a time when the respective cache line is invalidated.

26. The system of claim 25, further comprising means for determining if the epoch count associated with the executed load entries that are currently being retired is different than an epoch count value for a respective cache line to determine if a backup is to be initiated when retiring an executed load entry.

27. The system of claim 21, further comprising means for providing an indication of which of a plurality of data fills associated with a source request is a coherent data fill.

28. A method of executing program instructions employing a speculative data fill in a multi-processor system that conforms to a cache coherency protocol, the method comprising:
   transmitting source requests for data fills associated with cache lines in response to cache misses;
   executing program instructions across at least one memory barrier with data from a speculative data fill received from one or more other processors of the multi-processor system in response to one or more source requests, the speculative data fill being a copy of a requested data fill that has an undetermined coherency state;
   storing executed load entries in a log, each of the executed load entries comprising a load address and a program instruction address associated with a respective executed load instruction; and
   retiring a respective executed load entry from the log if a cache line associated with the speculative data fill has not been invalidated in an epoch that is prior to an epoch in which the executed load instruction is executed;
   receiving a coherent data fill from the multi-processor system after a speculative data fill is received in response to the one or more source requests.

29. The method of claim 28, further comprising re-executing program instructions from the program instruction address associated with a respective executed load entry that has a corresponding cache line that has been invalidated in a prior epoch to an epoch in which the executed load instruction is executed.

30. The method of claim 28, further comprising re-executing program instructions from a first user program instruction address if a cache line associated with the executed load entry has a corresponding speculative data fill that has been determined to be non-coherent, the first user program instruction is a first program instruction that employs data from the speculative data fill.

31. The method of claim 28, further comprising generating a plurality of cache line load entries, each cache line load entry includes a counter that retains a count associated with executed load entries associated with a respective cache line that are in the log.

32. The method of claim 31, wherein the cache line load entry includes an epoch flag field and an invalidated epoch count field, the epoch flag field being set if a cache line associated with the cache line load entry is invalidated and the invalidated epoch count field being set with an epoch value associated with the epoch in which executed load entries are currently being retired at a time when the cache line is invalidated.

33. The method of claim 32, further comprising incrementing an epoch counter associated with the epoch in which executed load entries are currently being retired, the epoch value in the invalidated epoch count field being compared with the epoch value in the epoch counter to determine if a cache line associated with the speculative data fill has been invalidated in a prior epoch.

* * * * *

UNITED STATES PATENT AND TRADEMARK OFFICE
CERTIFICATE OF CORRECTION

PATENT NO. : 7,360,069 B2
APPLICATION NO. : 10/756639
DATED : April 15, 2008
INVENTOR(S) : Simon C. Steely, Jr. et al.

It is certified that error appears in the above-identified patent and that said Letters Patent is hereby corrected as shown below:

Column 1, line 12, delete "10/756,638" and insert -- 10/756,636 --, therefor.

Column 1, line 22, delete "10/756,537" and insert -- 10/756,535 --, therefor.

Column 1, line 23, delete "10/755,914" and insert -- 10/755,919 --, therefor.

Column 21, line 23, in Claim 28, after "instruction;" delete "and".

Column 21, line 28, in Claim 28, after "executed;" insert -- and --.

Signed and Sealed this

Sixteenth Day of November, 2010

David J. Kappos
*Director of the United States Patent and Trademark Office*